US012594906B2

(12) United States Patent
Xu

(10) Patent No.: US 12,594,906 B2
(45) Date of Patent: Apr. 7, 2026

(54) UNIFIED CLOUD FOR MANAGING VEHICLES

(71) Applicant: DriveCloud LLC, San Jose, CA (US)

(72) Inventor: Ruian Xu, San Jose, CA (US)

( * ) Notice: Subject to any disclaimer, the term of this patent is extended or adjusted under 35 U.S.C. 154(b) by 273 days.

(21) Appl. No.: 18/244,223

(22) Filed: Sep. 9, 2023

(65) Prior Publication Data

US 2025/0083640 A1      Mar. 13, 2025

(51) Int. Cl.

| | |
|---|---|
| *B60R 25/24* | (2013.01) |
| *B60H 1/00* | (2006.01) |
| *B60R 25/01* | (2013.01) |
| *E05B 81/56* | (2014.01) |
| *E05F 15/70* | (2015.01) |
| *G06F 9/54* | (2006.01) |

(52) U.S. Cl.
CPC ....... *B60R 25/248* (2013.01); *B60H 1/00657* (2013.01); *B60R 25/01* (2013.01); *G06F 9/547* (2013.01); *E05B 81/56* (2013.01); *E05F 15/70* (2015.01); *E05Y 2900/55* (2013.01)

(58) Field of Classification Search
CPC ... B60R 25/248; B60R 25/01; B60H 1/00657; G06F 9/547; E05F 15/70; E05B 81/56; E05Y 2900/55
USPC .......................................................... 701/2
See application file for complete search history.

(56) References Cited

U.S. PATENT DOCUMENTS

| | | | | |
|---|---|---|---|---|
| 10,250,383 | B1 * | 4/2019 | Kumar ................ | H04W 12/108 |
| 10,614,644 | B2 * | 4/2020 | Endo ........................ | B60R 25/24 |
| 2017/0134382 | A1 * | 5/2017 | Darnell ................... | H04L 67/12 |
| 2020/0384948 | A1 * | 12/2020 | Toyooka ................ | H04M 11/00 |
| 2022/0254206 | A1 * | 8/2022 | Dykstra ................... | G07C 9/27 |

FOREIGN PATENT DOCUMENTS

| | | | | | |
|---|---|---|---|---|---|
| KR | 20200071201 | A | * | 6/2020 | ........... B60R 25/305 |

OTHER PUBLICATIONS

"Hypertext Transfer Protocol." Aug. 23, 2022. Wikipedia. https://web.archive.org/web/20220823133607/https://en.wikipedia.org/wiki/Hypertext_Transfer_Protocol (Year: 2022).*

* cited by examiner

*Primary Examiner* — Ramya P Burgess
*Assistant Examiner* — Hyang Ahn

(57) ABSTRACT

Provided is a unified system between a fleet of heterogeneous vehicles and the vehicles' heterogeneous cloud services for delivering a unified user interface to remotely control the fleet of vehicles. The system performs several functions, including obtaining digital vehicle tokens for each vehicle, which allow commands to be triggered on the associated vehicle clouds to manage the vehicles. Sets of APIs corresponding to the vehicle clouds are obtained, and when a user sends a request for a specific vehicle, a digital user token is generated and mapped to the vehicle's digital vehicle token. Subsequently, when user commands for managing the vehicle are received, the system constructs vehicle commands using the APIs of the vehicle's cloud service. Finally, the digital vehicle token and the vehicle commands are transmitted to the corresponding vehicle cloud for executing the commands and managing the vehicle accordingly.

19 Claims, 6 Drawing Sheets

110 Cloud A

112 Vehicle A 100 a user/an entity

122 Vehicle B

120 Cloud B

UNIFIED CLOUD FOR MANAGING VEHICLES

TECHNICAL FIELD

This disclosure relates to generally to a unified cloud between a fleet of heterogeneous vehicles and the vehicles' cloud services for providing a unified user interface to remotely control the fleet of vehicles.

BACKGROUND

Today's vehicles are commonly equipped with advanced technology and controls, including internet connectivity through 4G or 5G networks, as well as access to cloud services. These features enable users to remotely control their vehicles using their smartphones or smart devices. They can perform tasks such as starting the vehicle from a distance or adjusting settings like the air conditioner. Additionally, users can access various information about the vehicle, such as telematics data, trip history, battery status, and charging records. When a user enters a command through their smart device, typically via dedicated applications, the command is sent to a cloud service along with the unique identifier of the target vehicle. Using this information, the cloud service can access the vehicle's data or send management commands to control its operation accordingly.

In many scenarios, it is common for an individual or organization to be responsible for overseeing multiple vehicles from various manufacturers. However, this task can become increasingly challenging when these vehicles utilize different cloud services and mobile applications with distinct user interfaces. As the number of vehicles grows, managing this heterogeneity through various cloud services can become impractical. To address this issue, this disclosure introduces a unified cloud service designed to streamline the management of diverse cloud services. This unified service handles the complexities associated with different APIs, communication protocols, security requirements, and more from the different cloud services and mobile applications. Its purpose is to enable users to manage a range of heterogeneous vehicles seamlessly through a unified user interface.

SUMMARY

In some aspects, the techniques described herein relate to a computer-implemented method, including: obtaining, by a computing device, a plurality of digital vehicle-keys corresponding to a plurality of vehicles, wherein the plurality of vehicles are registered with a plurality of vehicle-clouds associated with the plurality of vehicles and allow remotely controlling the vehicles through the plurality of vehicle-clouds; obtaining, by the computing device, a plurality of sets of APIs corresponding to the plurality of vehicle-clouds associated with the plurality of vehicles; receiving, by the computing device, a first request for a vehicle from a user; generating, by the computing device, a digital user-token based on the request and transmitting the digital user-token to the user; mapping, by the computing device, the digital user-token and the digital vehicle-key of the vehicle; receiving, by the computing device, a second request from the user including the digital user-token and one or more user-commands for managing the vehicle; retrieving, by the computing device, the digital vehicle-key of the vehicle based on the digital user-token in the second request; constructing, by the computing device, one or more vehicle commands based on the one or more user-commands using the set of APIs of the vehicle-cloud associated with the vehicle; and transmitting, by the computing device, the digital vehicle-key of the vehicle and the one or more vehicle commands to a vehicle-cloud corresponding to the vehicle for managing the vehicle according to the one or more vehicle commands.

In some aspects, the techniques described herein relate to a method, wherein the first request includes a time period for using the vehicle, and the generating a digital user-token includes: configuring a valid time window for the digital user-token based on the time period in the first request; embedding the valid time window into the digital user-token.

In some aspects, the techniques described herein relate to a method, wherein after receiving the second request from the user, the method further includes: decoding the valid time window from the digital user-token; verifying whether the digital user-token is expired; and in response to the digital user-token being expired, sending an error message to the user.

In some aspects, the techniques described herein relate to a method, wherein the generating the digital user-token includes: signing the digital user-token using a private key of the computing device, such that the digital user-token is verifiable by the user using a public key of the computing device.

In some aspects, the techniques described herein relate to a method, wherein the one or more user-commands includes commands for locking or unlocking of the vehicle, locating the vehicle, opening or closing one or more windows, opening or closing a compartment of the vehicle, controlling air conditioner or windows, or summoning the vehicle.

In some aspects, the techniques described herein relate to a method, wherein the second request includes a GPS location of a smart device from which the second request was received.

In some aspects, the techniques described herein relate to a method, further including: obtaining a GPS location of the vehicle; determining whether a distance between a GPS location of the smart device and the GPS location of the vehicle is greater than a threshold; in response to the distance being greater than a threshold, sending an error message to the user.

In some aspects, the techniques described herein relate to a method, further including: in response to the distance being lower than the threshold, transmitting the GPS location of the smart device to the vehicle-cloud.

In some aspects, the techniques described herein relate to a method, further including: displaying a graphic user interface (GUI) to the user exposing a plurality of unified APIs for managing vehicles through the plurality of sets of APIs.

In some aspects, the techniques described herein relate to a method, wherein the second request is generated by the user triggering one or more of the plurality of unified APIs, wherein one of the one or more unified APIs includes a parameter for specifying the digital user-token.

In some aspects, the techniques described herein relate to a method, wherein the constructing one or more vehicle commands based on the one or more user-commands using the set of APIs of the vehicle-cloud associated with the vehicle includes: generating one or more HTTP requests including one or more of GET, POST, PUT, DELETE with a payload based on the one or more user-commands.

In some aspects, the techniques described herein relate to a method, wherein the second request further includes a GPS location of a second smart device from which the second request was received and a second timestamp, the method further includes: receiving a third request from the user including the digital user-token, one or more third user-commands for managing the vehicle, and a GPS location of a third smart device from which the third request was received and a third timestamp; determining a time gap between the second timestamp and the third timestamp and a distance between the GPS location of the second smart device and the GPS location of the third smart device; and disabling the user-token in response the time gap being lower than a time threshold and the distance being greater than a distance threshold.

In some aspects, the techniques described herein relate to a method, wherein after receiving the first request for the vehicle from the user and before generating the digital user-token based on the request, the method further includes: checking if the digital vehicle-key of the vehicle is already linked to another digital-token; in response to the digital vehicle-key of the vehicle being already linked to another digital-token, sending an error message to the user.

In some aspects, the techniques described herein relate to a method, further including: after generating the digital user-token for a period of time that is greater than a threshold period, performing key rotation by: generating a second digital user-token based on the first request from the user; replacing the digital user-token in the link between the digital user-token and the digital vehicle-key of the vehicle with the second digital user-token; and sending the second digital user-token to the user.

In some aspects, the techniques described herein relate to a method, wherein the generating of the second digital user-token includes: detecting whether there are pending user-commands for managing the vehicle using the digital user-token; and in response to pending user-commands being detected, delaying the key rotation by a preset delay period before retrying.

In some aspects, the techniques described herein relate to a method, wherein the digital user-token is generated using a cryptographic hash function.

In some aspects, the techniques described herein relate to a system including one or more processors and one or more non-transitory computer-readable memories coupled to the one or more processors and configured with instructions executable by the one or more processors to cause the system to perform operations including: obtaining a plurality of digital vehicle-keys corresponding to a plurality of vehicles, wherein the plurality of vehicles are registered with a plurality of vehicle-clouds associated with the plurality of vehicles and allow remotely controlling the vehicles through the plurality of vehicle-clouds; obtaining a plurality of sets of APIs corresponding to the plurality of vehicle-clouds associated with the plurality of vehicles; receiving a first request for a vehicle from a user; generating a digital user-token based on the request and transmitting the digital user-token to the user; mapping the digital user-token and the digital vehicle-key of the vehicle; receiving a second request from the user including the digital user-token and one or more user-commands for managing the vehicle; retrieving the digital vehicle-key of the vehicle based on the digital user-token in the second request; constructing one or more vehicle commands based on the one or more user-commands using the set of APIs of the vehicle-cloud associated with the vehicle; and transmitting the digital vehicle-key of the vehicle and the one or more vehicle commands to a vehicle-cloud corresponding to the vehicle for managing the vehicle according to the one or more vehicle commands.

In some aspects, the techniques described herein relate to a system, wherein the one or more user-commands includes commands for locking or unlocking of the vehicle, locating the vehicle, opening or closing one or more windows, opening or closing a compartment of the vehicle, controlling air conditioner or windows, or summoning the vehicle.

In some aspects, the techniques described herein relate to a system, wherein the second request includes a GPS location of a smart device from which the second request was received, and the operations further include: obtaining a GPS location of the vehicle; determining whether a distance between a GPS location of the smart device and the GPS location of the vehicle is greater than a threshold; in response to the distance being greater than a threshold, sending an error message to the user.

In some aspects, the techniques described herein relate to a non-transitory computer-readable storage medium configured with instructions executable by one or more processors to cause the one or more processors to perform operations including: obtaining a plurality of digital vehicle-keys corresponding to a plurality of vehicles, wherein the plurality of vehicles are registered with a plurality of vehicle-clouds associated with the plurality of vehicles and allow remotely controlling the vehicles through the plurality of vehicle-clouds; obtaining a plurality of sets of APIs corresponding to the plurality of vehicle-clouds associated with the plurality of vehicles; receiving a first request for a vehicle from a user; generating a digital user-token based on the request and transmitting the digital user-token to the user; mapping the digital user-token and the digital vehicle-key of the vehicle; receiving a second request from the user including the digital user-token and one or more user-commands for managing the vehicle; retrieving the digital vehicle-key of the vehicle based on the digital user-token in the second request; constructing one or more vehicle commands based on the one or more user-commands using the set of APIs of the vehicle-cloud associated with the vehicle; and transmitting the digital vehicle-key of the vehicle and the one or more vehicle commands to a vehicle-cloud corresponding to the vehicle for managing the vehicle according to the one or more vehicle commands.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

DETAILED DESCRIPTION

As mentioned in the background section, the vehicle industry is experiencing a shift towards integrating wireless connectivity and enabling control of vehicles through smart devices. This trend is fueled by the rapid advancement of technology and the increasing demand for connected and convenient experiences. Many modern vehicles now come equipped with internet connectivity options, such as 4G or 5G networks, allowing them to establish wireless connections with external devices. This shift enables the vehicle owners to remotely control the vehicles using smart devices.

Figure 1:
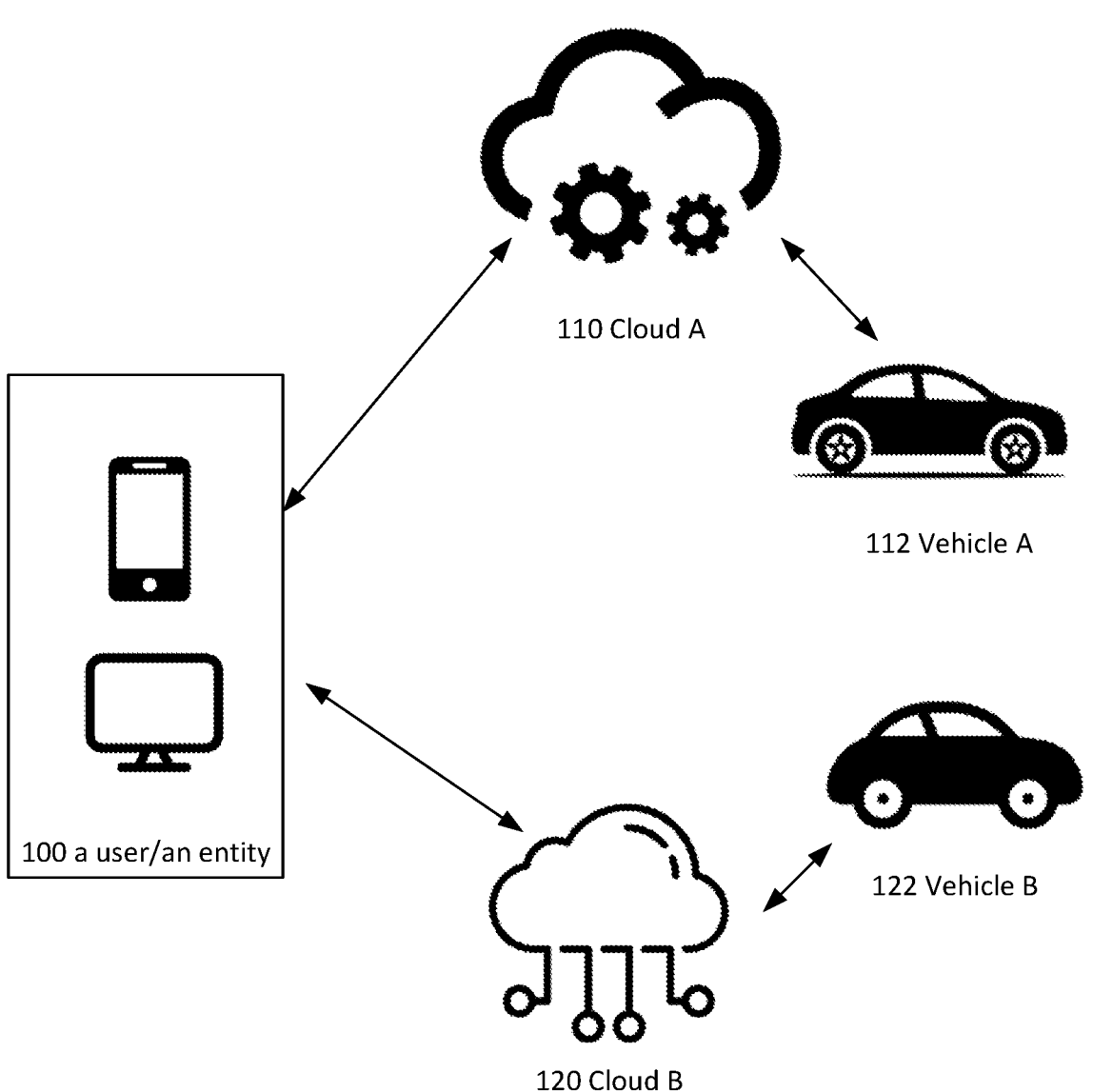
FIG. 1 illustrates a network environment in which a user is allowed use smart devices to remotely control vehicles through cloud services, in accordance with some embodiments.

FIG. 1 illustrates a network environment in which a user 100 is allowed use smart devices to remotely control vehicles through cloud services, in accordance with some embodiments. The user 100 may refer to an individual, a family, a company, or another suitable form of entity that can own one or more vehicles.

As shown, the user 100 can use smart devices or computing devices to control vehicles through the cloud services corresponding to the vehicles. In today's industry, different vehicle manufactures usually have different vehicle cloud services (either in-house or third-party). For example, vehicle A 112 corresponds to vehicle cloud A 110, and vehicle B 122 corresponds to vehicle cloud B 120. Different vehicle cloud services generally have varying configurations, including distinct Application Program Interfaces (APIs), data encryption schemes, and data security requirements. These services may provide their user interfaces through separate web portals or mobile applications. At the same time, it is increasingly common for users, including individuals, to possess multiple vehicles. As a result, users frequently face the need to access various web portals, platforms, or install multiple applications on their smart devices to control their diverse vehicles. Although this process may merely cause inconveniences for individual users, it poses significant challenges for large vehicle management entities like car rental companies, rendering remote management of such heterogeneous fleets impractical.

In an example, when a user 100 obtains the ownership of the vehicle 112, it registers the vehicle 112 with the vehicle cloud to obtain a unique digital token (a unique identifier) that corresponding to the vehicle. This digital token helps establish a secure and authenticated connection between the vehicle and the cloud services provided by the vehicle manufacture. Then the user can setup the vehicle's application on a smart device (e.g., a smart phone, a smart watch, etc.) as a digital vehicle-key to remotely control the vehicle. During the setup process, the application also generates a unique digital vehicle-key that is securely stored in the app and linked to the specific vehicle. In order words, while the unique digital token of the vehicle works as the identifier of the vehicle, the unique digital vehicle-key (the application on the smartphone) works as the digital vehicle-key of the vehicle. One vehicle can have multiple digital vehicle-keys but only one digital identifier. When the driver approaches the vehicle with the smartphone, the NFC or Bluetooth technology in the car and/or the smartphone may confirm the presence of the digital vehicle-key and thus unlock the doors. In addition, the driver can use the application on the smartphone to send user-commands to the vehicle's cloud (also referred to as the vehicle cloud) to remotely control the vehicle. The user-commands may identify the unique digital token of the vehicle as the target vehicle and be authenticated (signed) by the digital vehicle-key. When the vehicle cloud receives the user-commands, it identifies the vehicle based on the unique digital token and decodes the user-commands to manage the vehicle accordingly.

As mentioned in the background section, when the user 100 manages multiple vehicles, he may need to repeat the above-described registration and phone key setup process for each individual vehicle, and manage different types/models of vehicles using different applications. The following description illustrates a unified cloud service as a unified user interface that hides all the heterogenous vehicle clouds, and allows the user 100 to manage different types/models of vehicles through the same user interface (e.g., a single application on a smart phone).

Figure 2:
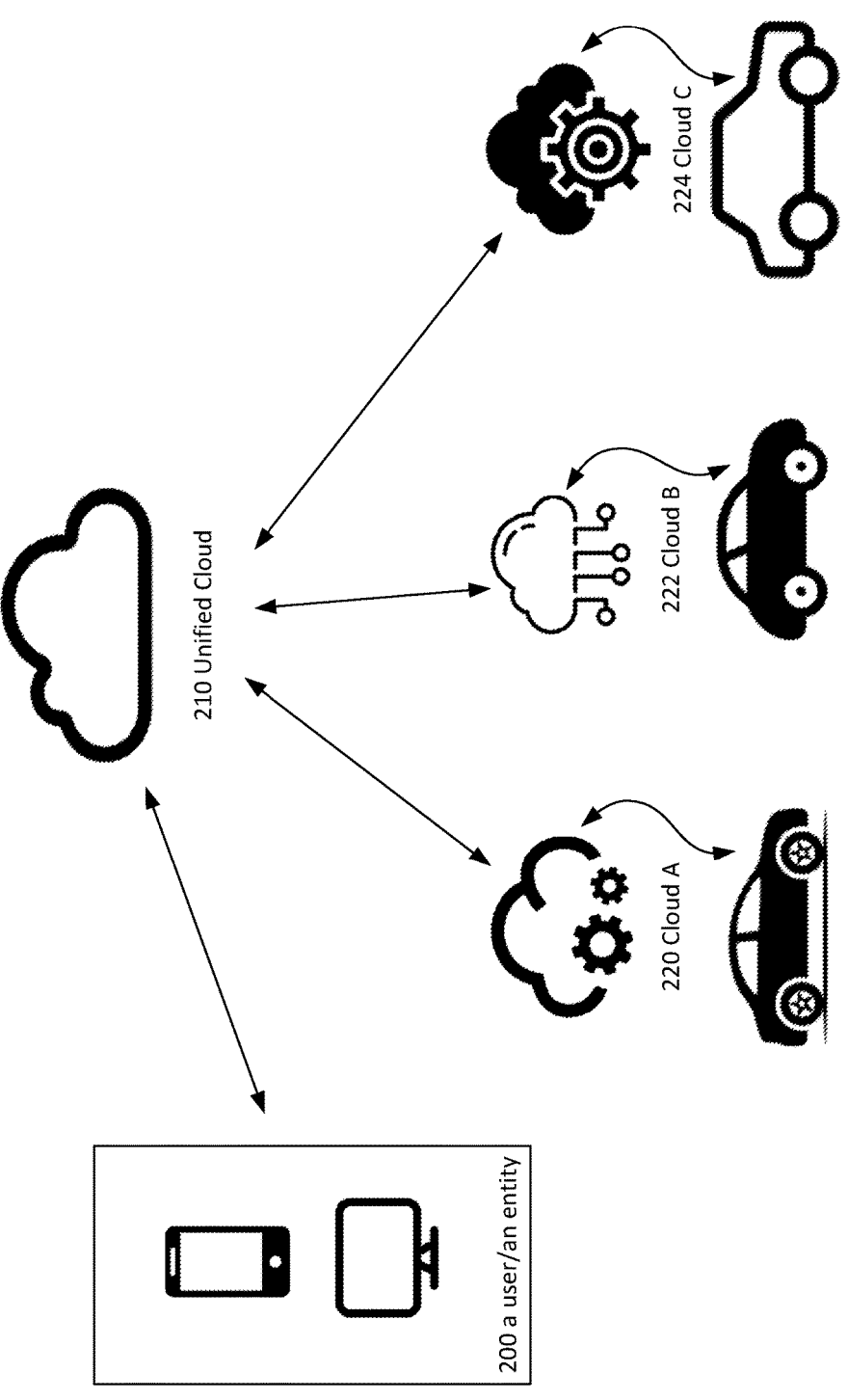
FIG. 2 illustrates an example system diagram of the unified cloud for managing vehicles from different vehicle clouds, in accordance with some embodiments.

FIG. 2 illustrates an example system diagram of the unified cloud for managing vehicles from different vehicle clouds, in accordance with some embodiments. As shown, the unified cloud 210 provides a unified user interface to the user 200, allowing the user 200 to access different vehicle cloud services 220, 222, and 224 that respectively manage different models/types of vehicles. With the unified cloud 210, the user 200 does not need to install different applications corresponding to the vehicle cloud services 220, 222, and 224.

In some embodiments, the unified cloud 210 may function as a ride-hailing service or ride-sharing service where users make immediate reservation requests. In these cases, the users 200 typically utilize their mobile devices to send specific queries to the unified cloud service 210, specifying their preferences, such as the type of vehicle they desire (considering factors like capacity, model, year, color, or any combination thereof).

To facilitate this process, the cloud server 210 obtains real-time GPS location data from the user's mobile device. Subsequently, the cloud server 210 initiates real-time queries to the multiple vehicle cloud services 220, 222, and 224. These queries aim to identify available vehicles that align with the user's query and are situated within a predefined radius from the user's current GPS location.

The responses received from the vehicle cloud services 220, 222, and 224 are then collected and consolidated by the unified cloud 210. These aggregated responses are subsequently presented to the user 200.

It's important to note that this intricate process relies on real-time GPS location tracking and simultaneous real-time queries to multiple vehicle cloud services-a task that cannot be practically performed by humans in traditional call centers or dispatch centers. This level of real-time data processing sets apart modern cloud-based services like this from traditional manual operations.

Figure 3:
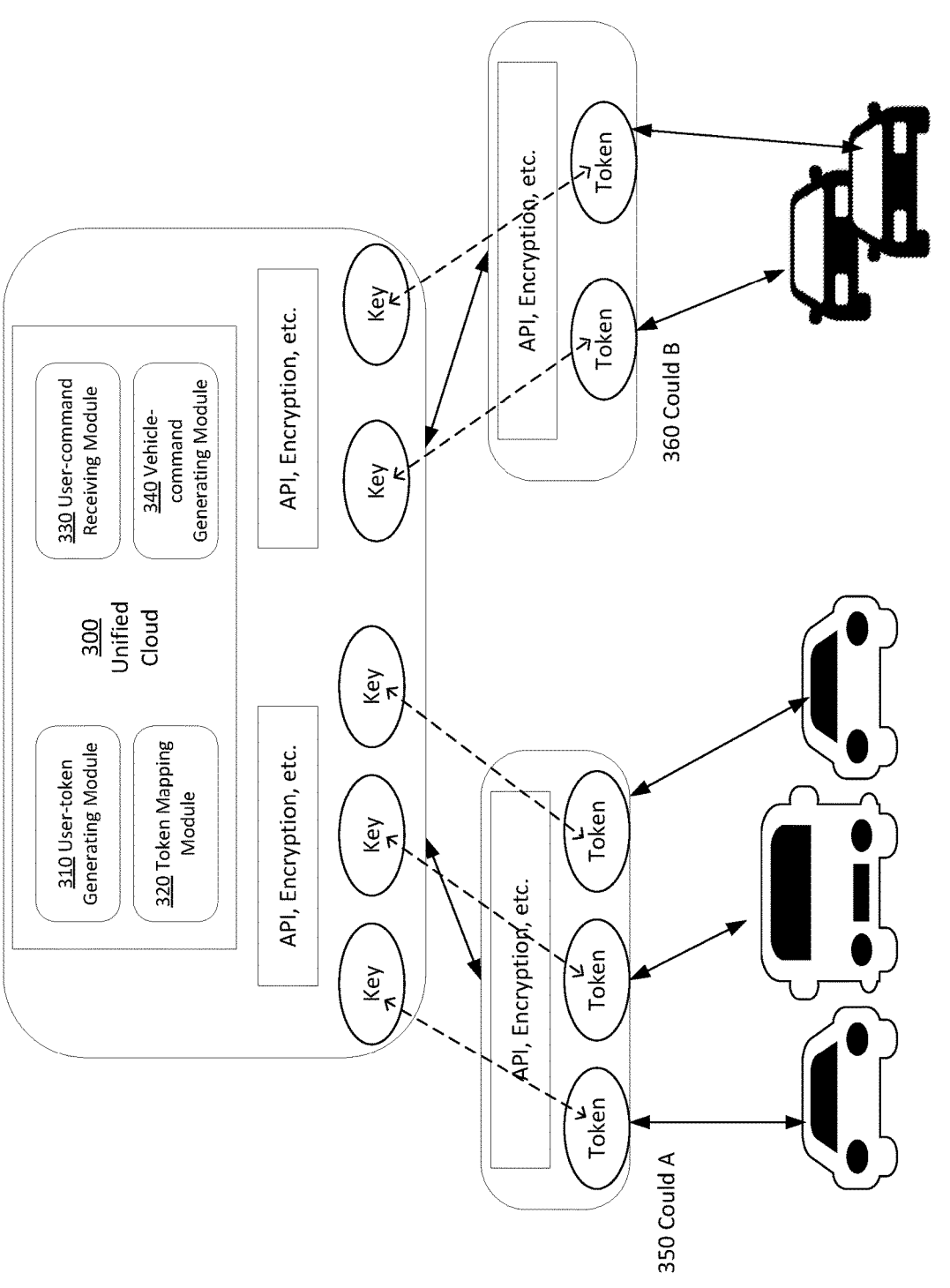
FIG. 3. illustrates a more detailed system diagram of the unified cloud for managing vehicles from different vehicle clouds, in accordance with some embodiments

FIG. 3. illustrates a more detailed system diagram of the unified cloud for managing vehicles from different vehicle clouds, in accordance with some embodiments.

In some embodiments, when vehicles are initially acquired, they are registered with their corresponding vehicle clouds to obtain their respective unique digital tokens. As shown in FIG. 3, the three vehicles from manufacturer A have registered with cloud A 350 for their digital tokens (denoted as Token), and the two vehicles from a different manufacturer have registered with cloud B 360 for their digital token. These digital tokens uniquely identifies the vehicles.

In some embodiments, the unified cloud 300 may register a plurality of digital vehicle-keys to manage the vehicles. These digital vehicle keys may be obtained through the corresponding vehicle clouds 350 and 360, and each vehicle key may be mapped to one unique digital token of a corresponding vehicle. One digital token of the vehicle may be mapped to one or more digital vehicle keys. These vehicle keys allow the unified cloud, acting as an owner of the vehicles, to remotely mange the vehicles by sending vehicle management commands through corresponding vehicle clouds 350 and 360.

In some embodiments, the two different clouds 350 and 360 have different configurations such as of APIs, encryption schemes, authentication process, etc. The unified cloud 300 may obtain information of the different configurations and construct a unified user interface. For example, the two clouds 350 and 360 may have different APIs for unlocking a vehicle. The unified user interface may create a unified API for unlocking a vehicle that includes a branching logic based on vehicle types. The branching logic (a piece of programming code) may identify the vehicle type of the target vehicle based on the user command (e.g., the user command may carry the target vehicle's information) and redirect the request to the corresponding cloud and trigger the corresponding API to unlock the target vehicle.

In an example, the unified cloud 300 may be associated with a vehicle rental/lease company managing a fleet of heterogenous vehicles. The unified cloud 300 may include a user-token generating module 310, a token mapping module 320, a user-command receiving module 330, and a vehicle-command generating module 340. These modules are for illustration purposes only. Depending on the implementation, the unified cloud 300 may include fewer, more, or alternative modules.

In some embodiments, when a user requests for a vehicle managed by the unified cloud 300 (or the entity manages the unified cloud), the request may be received from the user's account logged in on a smart phone or computer. The user-token generating module 310 may be configured to generate a digital user-token based on the request and transmit the digital user-token back to the user's account. The digital user-token may be generated using a cryptographic hash function. This digital user-token is different from the digital vehicle-keys owned by the unified cloud 300 and the digital vehicle-tokens of the vehicles. The digital user-token is a unique string that is allocated for the user account for authenticating further user-commands sent from the user account. If the vehicle requested by the user is available, the digital user-token is mapped to the digital vehicle-key of the vehicle by the token mapping module 320.

The user-command receiving module 330 may be configured to receive user-commands from a user account for controlling a vehicle. The user-commands may include locking or unlocking of the vehicle, locating the vehicle, opening or closing one or more windows, opening or closing a compartment of the vehicle, controlling air conditioner or windows, or summoning the vehicle. In some embodiments, the user-commands may include the digital user-token of the user account for authentication purposes. Based on the digital user-token in the received user commands, the unified cloud 300 may retrieve the digital vehicle-key that is mapped to the digital user-token. Then the vehicle-command generating module 340 may be configured to generate specific vehicle commands based on the user commands using the APIs of the corresponding vehicle cloud. The vehicle commands may be authenticated by the digital vehicle key and transmitted to the vehicle cloud. The vehicle cloud may then identify the target vehicle based on a mapping between the digital vehicle key and the unique vehicle token, and execute the vehicle commands to control the vehicle, such as to unlock, lock, turn on or off AC or windows, etc.

In some embodiments, the vehicles may also send status information (e.g., real-time updates and alerts, charging progress, software updates, and other relevant information) through corresponding vehicle clouds to the devices hosting the digital vehicle keys. When the unified cloud (e.g., a computing device of the unified cloud registered as the digital vehicle key) receives such status information, it may look up the database and check if there is a digital user-token linked to the digital vehicle key of the vehicle. If such digital user-token exists, the unified cloud may send a push notification to the user account associated with the digital user-token.

Figure 4:
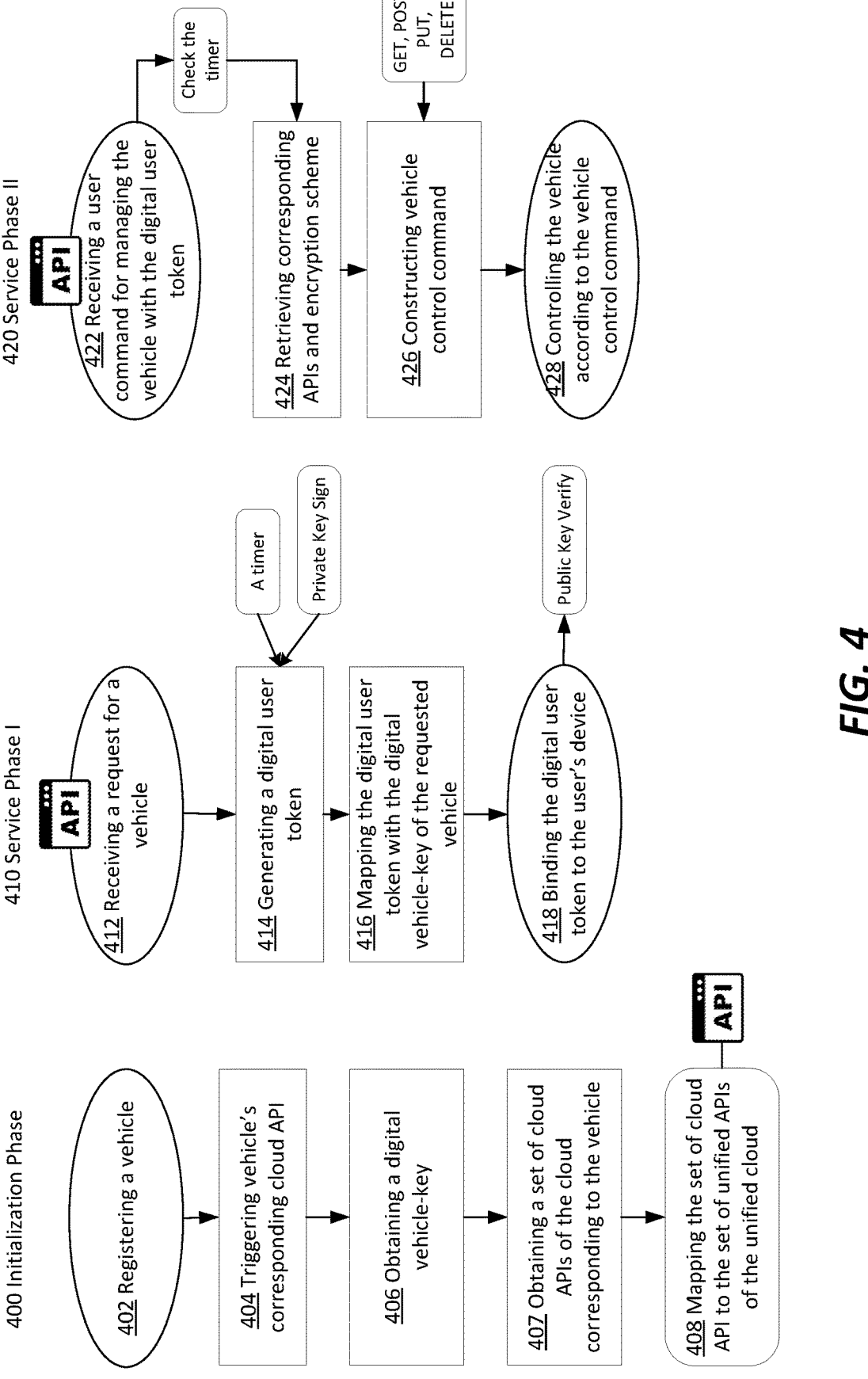
FIG. 4 illustrates different phases of the unified cloud for managing vehicles from different vehicle clouds, in accordance with some embodiments.

FIG. 4 illustrates different phases of the unified cloud for managing vehicles from different vehicle clouds, in accordance with some embodiments.

The first phase is an initialization phase 400, during which the vehicles are registered at step 402, vehicle's corresponding cloud APIs are triggered at step 404 to generate vehicle keys at step 406, various vehicle APIs are collected at step 407 and mapped to a set of unified APIs at step 408. The unified APIs may be exposed to the users as a graphic user interface (GUI). For example, the unified cloud may build a set of unified APIs in which each API may trigger multiple APIs of multiple vehicle clouds according to the vehicle's type or model. When a car rental company purchase a fleet of vehicles. it may register the vehicles (to obtain the unique vehicle tokens) and digital vehicle-keys (each digital vehicle-key maps to one unique vehicle token for remotely managing the corresponding vehicle) through the unified cloud.

After the initialization phase 400, two service phases 410 and 420 may be implemented. During the service phase I 410, a user may send a request (e.g., a rental request or a lease request) for a vehicle at step 412 using the unified API of the unified cloud. In response to the request, the unified cloud may determine whether the requested vehicle is available for the requested time window. If the requested vehicle is available, it generates a digital user-token at step 414. The digital user-token is uniquely associated with the user's account. In some embodiments, a valid time window may be configured for the digital user-token based on the requested time window. The valid time window may be in a form of time stamp and embedded into the digital user-token. For example, the valid time window may be appended to the digital user-token, e.g., a hash value generated for the user account. The digital user-token may be mapped to the digital vehicle-key of the requested vehicle at step 416, indicating the user account possessing the digital user-token can remotely access and manage the requested vehicle through the digital vehicle-key. One user account may possess multiple digital user-tokens for managing multiple vehicles.

In some embodiments, to further enhance the data security, the digital user-token may be signed with a private key of the unified cloud. The digital user-token may be bound to the user's smart device such that only the user's smart device can use such digital user-token (e.g., not allowing other means of using the digital user-token). When the user's device receives the user-token, it may authenticate the digital user-token with a public key of the unified cloud at step 418.

The service phase II 420 includes how a user remotely manages the requested vehicle. In some embodiments, the user may send one or more user-commands (such as unlocking or locking doors, turning on or off AC or windows) for managing the vehicle through the unified APIs of the unified cloud at step 422. The user-commands may be generated by the user triggering one or more of the plurality of unified APIs, and one of the one or more unified APIs comprises a parameter for specifying the digital user-token for the unified cloud to authenticate the user-commands. In some cases, the unified cloud may decode the user-commands to extract the valid time window of the digital user-token, and validate the user-commands based on the valid time window. If the digital user-token is expired, the unified cloud may return an error message to the user indicating invalid operations.

If the digital user-token is valid, the unified cloud may determine the vehicle information from the user-commands, and retrieve corresponding vehicle-cloud APIs and encryption scheme at step 424. Then the unified cloud may construct vehicle control commands based on the user-commands using the retrieved APIs and encryption algorithms at step 426. In some embodiments, the vehicle-cloud APIs may include HTTP requests, such as one or more of GET, POST, PUT, DELETE with a payload based on the one or more user-commands. These HTTP requests may then be transmitted to the corresponding vehicle-cloud for control the vehicle at step 428. Here, the "unified cloud" performing the above-described steps refer to one or more computing devices associated with the unified cloud.

Figure 5:
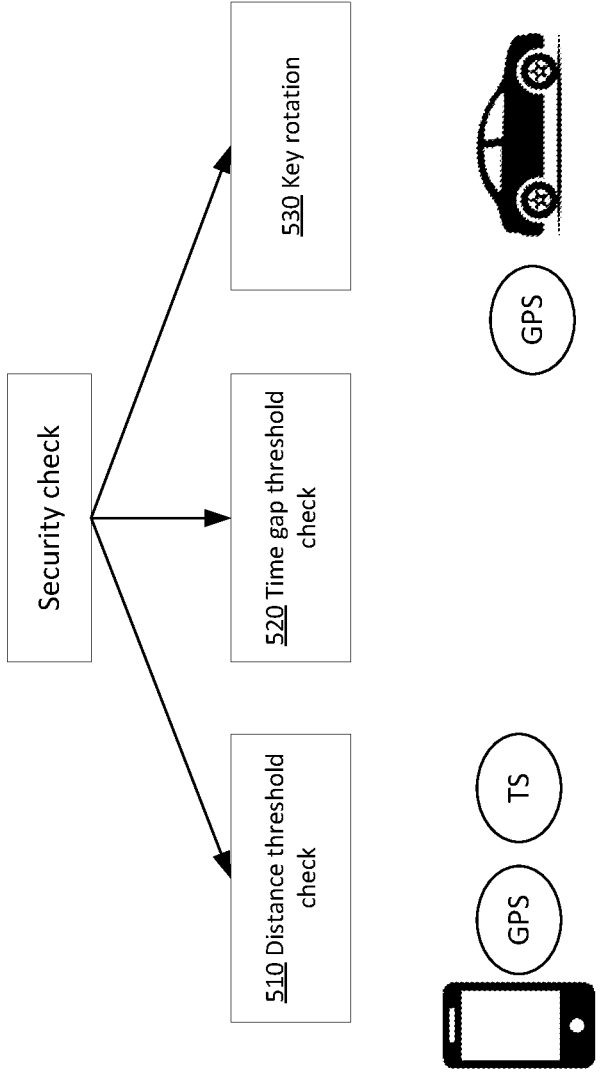
FIG. 5 illustrates example security measurements implemented in the unified cloud, in accordance with some embodiments.

FIG. 5 illustrates example security measurements implemented in the unified cloud, in accordance with some embodiments. These security measurements may be implemented to prevent fraud and malicious acts, and enhance data security.

In some embodiments, a distance threshold check may be implemented to verify the distance between a user sending out user-commands for managing vehicle and the target vehicle is within a distance threshold. This check may not be needed for individual users managing their own vehicles, but for vehicle rental or lease companies, they often expect the driver to be close the vehicle in order to manage it. For example, the driver needs to be in the same city as the vehicle. If the distance between the driver (e.g., the driver's smartphone) and the vehicle is greater than the distance threshold, an error message may be delivered to the driver's smartphone indicating invalid operations. The distance threshold check 510 may rely on the GPS location of the device from which the user-commands are sent and the GPS location of the vehicle to be managed.

In some embodiments, the distance threshold check can also serve to identify instances where a vehicle ventures beyond the boundaries specified in a contractual agreement. For example, when a user reserves a vehicle through the unified cloud service, a virtual permissible map region can be created for that vehicle. This virtual region can be initially set to a default value, like 150 miles from the pick-up location, but it's open to negotiation with the user, potentially resulting in a smaller travel area for a reduced cost. To determine if the vehicle has strayed beyond this virtual permissible map region, real-time GPS data from the vehicle or the mobile device of the driver may be collected and analyzed.

There are various ways to implement this feature. One approach involves configuring the virtual permissible map region within the vehicle itself, such as by downloading the region data onto the vehicle's system. Alternatively, it can be configured within the mobile device carried by the driver, typically by downloading the region data onto a software or app installed on the user's mobile device. In either case, the GPS data from the vehicle or mobile device is used for local comparison against the virtual permissible map region, without the need for real-time communication with the cloud server.

Another implementation method entails periodically transmitting real-time GPS data to the cloud server. While this method demands continuous location tracking and more frequent data exchanges between the cloud and the vehicle/mobile device, it provides real-time monitoring capabilities on the server side. When a violation is detected, the system can trigger notifications, which may be sent to the server, displayed as warnings on the vehicle's screen, or communicated to the user's mobile device, among other possibilities. It is noticeable, with the continuous development of battery technology and improvement in chips (semiconductor devices), process and technology, the relative consumption of such communication would become routine/regular task of connected vehicles.

In some embodiments, a time gap threshold check 520 may be implemented to prevent malicious acts. For example, multiple user-commands carrying the same digital user-token may be received for managing the corresponding vehicle, and the multiple user-commands include their respective GPS locations and timestamps. The time gap threshold check 520 may determine a time gap between the consecutive user-commands' timestamps and a distance between the GPS location of smart devices sent out the consecutive user-commands. If the time gap is lower than a time threshold and the distance is greater than a distance threshold, it may indicate that there are multiple devices from different locations that are trying to manage the vehicle at the same time. In these cases, the digital user-token may have been compromised, and the unified cloud may disable the digital user-token for safety concerns.

In some embodiments, key rotations 530 may be implemented against the generated digital user-tokens to enhance the security of the unified cloud by regularly replacing existing digital user-tokens with new ones. For example, after a digital user-token generated for a user account for a period of time that exceeds a predefined threshold, the key rotation scheme may automatically starts and perform the following steps. First, a second digital user-token is generated based on the initial user request. Next, the original digital user-token, which is linked to the digital vehicle-key of the vehicle, is replaced with the newly generated second digital user-token. The second digital user-token is then sent to the user. Additionally, before commencing the key rotation process, the unified cloud checks if there are any pending user-commands associated with the digital user-token for managing the vehicle. If pending user-commands are detected, the key rotation process is temporarily delayed by a preset delay period before it is retried. This scheme ensures the regular rotation of user-tokens for enhanced security while accounting for any pending user-commands.

In some embodiments, there may be other types of security checks such as no-double-booking check, in which the unified cloud may check if the digital vehicle-key of a requested vehicle is already mapped to a digital user-token. If so, the incoming request for the specific vehicle will receive an error message.

In some embodiments, the unified cloud may train and use various machine learning models to improve its fleet management. For instance, a first machine learning model may be configured for predictive vehicle maintenance. The training of such machine learning model may be based on historical vehicle sensor data and maintenance records. Once trained, the model may be deployed to predict or identify issues based on live sensor data from the vehicle. By identifying issues in advance, the unified cloud can help schedule maintenance proactively, reducing unplanned downtime and maintenance costs.

As another example, the unified cloud may deploy a demand forecasting machine learning model that analyzes historical demand data and external factors like holidays and events to predict demand for transportation services. The unified cloud can use these insights to allocate resources more effectively and meet customer demands efficiently. The machine learning model may be capable of continuously updating its predictions as new data becomes available. For instance, if an unexpected event occurs, such as a sudden surge in demand due to an unscheduled event, the model can quickly adapt and provide updated recommendations to fleet managers in real-time.

In some embodiments, the unified cloud may anonymize end users to safeguard personally identifiable information (PII). Firstly, it's crucial to isolate and protect user data within the unified cloud service. This involves segregating PII from other non-sensitive data and establishing strict access controls. Encryption plays a pivotal role in this process. Data should be encrypted both at rest and during transit to prevent unauthorized access, ensuring that even if a breach occurs, the data remains secure. The unified cloud may implement tokenization to replace sensitive data with unique tokens.

In some embodiments, the unified cloud platform can also generate user profiles for its users. When a user gives consent, the cloud has the capability to retain their preferred vehicle configurations. These configurations encompass details such as air conditioning preferences, seat adjustments, and driving mode settings. Subsequently, these saved preferences can be seamlessly applied to any newly reserved vehicle by that user. This is achieved by transmitting tailored vehicle management commands through the vehicle's user interfaces using communication protocols, effectively implementing the user's favored settings on the reserved vehicle.

Figure 6:
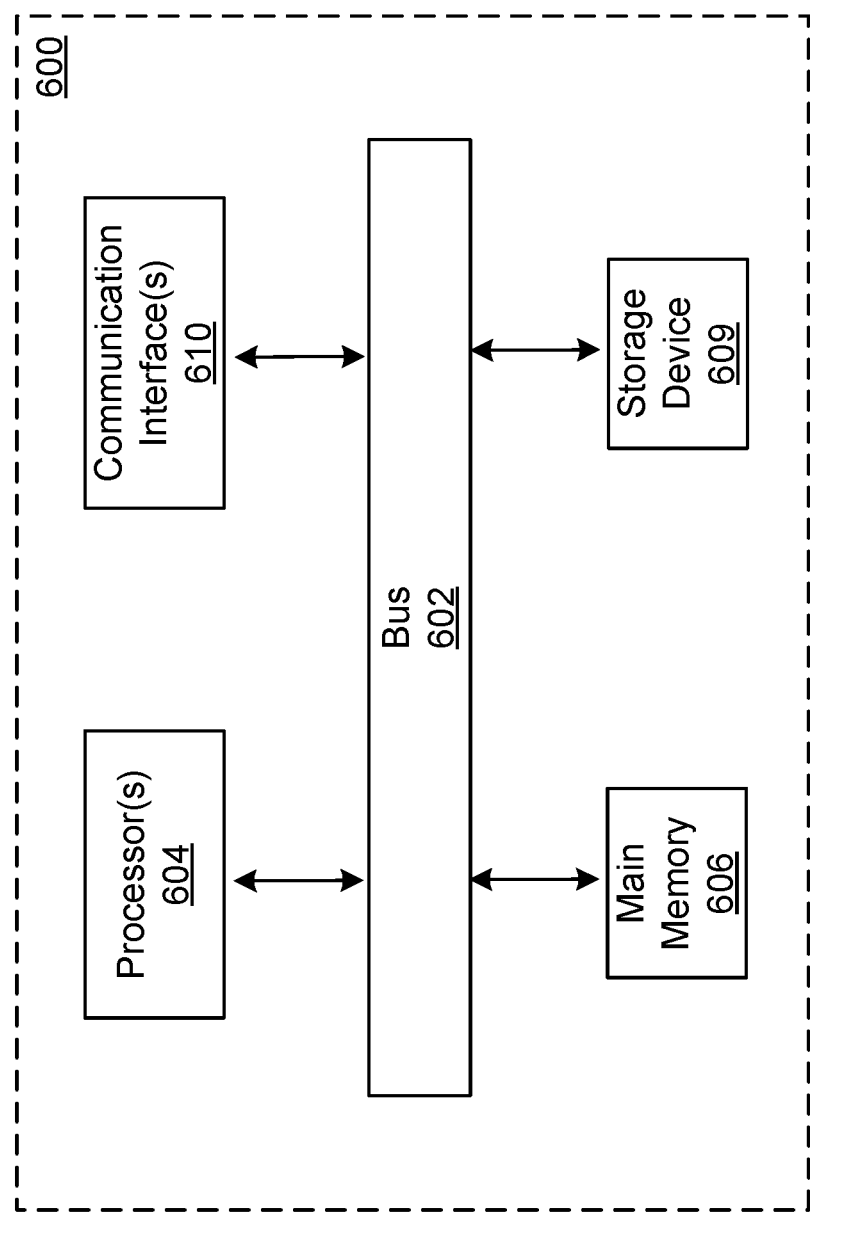
FIG. 6 illustrates an example computing device in which any of the embodiments described herein may be implemented.

FIG. 6 illustrates an example computing device in which any of the embodiments described herein may be implemented. The computing device 600 may be used to implement the unified cloud or one or more components of the unified cloud shown in FIGS. 1-5 The computing device 600 may comprise a bus 602 or other communication mechanism for communicating information and one or more hardware processors 604 coupled with bus 602 for processing information. Hardware processor(s) 604 may be, for example, one or more general purpose microprocessors.

The computing device 600 may also include a main memory 606, such as a random-access memory (RAM), cache and/or other dynamic storage devices, coupled to bus 602 for storing information and instructions to be executed by processor(s) 604. Main memory 606 also may be used for storing temporary variables or other intermediate information during execution of instructions to be executed by processor(s) 604. Such instructions, when stored in storage media accessible to processor(s) 604, may render computing device 600 into a special-purpose machine that is customized to perform the operations specified in the instructions.

Main memory 606 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The computing device 600 may implement the techniques described herein using customized hard-wired logic, one or more ASICs or FPGAs, firmware and/or program logic which in combination with the computing device may cause or program computing device 600 to be a special-purpose machine. According to one embodiment, the techniques herein are performed by computing device 600 in response to processor(s) 604 executing one or more sequences of one or more instructions contained in main memory 606. Such instructions may be read into main memory 606 from another storage medium, such as storage device 609. Execution of the sequences of instructions contained in main memory 606 may cause processor(s) 604 to perform the process steps described herein. For example, the processes/methods disclosed herein may be implemented by computer program instructions stored in main memory 606. When these instructions are executed by processor(s) 604, they may perform the steps as shown in corresponding figures and described above. In alternative embodiments, hard-wired circuitry may be used in place of or in combination with software instructions.

The computing device 600 also includes a communication interface 610 coupled to bus 602. Communication interface 610 may provide a two-way data communication coupling to one or more network links that are connected to one or more networks. As another example, communication interface 610 may be a local area network (LAN) card to provide a data communication connection to a compatible LAN (or WAN component to communicate with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer readable storage medium. Particular technical solutions disclosed herein (in whole or in part) or aspects that contribute to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof. The functions described in this document have the potential to be provided in the form of Software-as-a-Service (SaaS), which means they can be made available to users as cloud-based software solutions accessed over the internet, typically on a subscription basis.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A computer-implemented method, comprising:
obtaining, by a computing device, a plurality of digital vehicle-keys corresponding to a plurality of vehicles, wherein the plurality of vehicles are registered with a plurality of vehicle-clouds associated with the plurality of vehicles and allow remotely controlling the vehicles through the plurality of vehicle-clouds;
obtaining, by the computing device, a plurality of sets of APIs corresponding to the plurality of vehicle-clouds associated with the plurality of vehicles;
receiving, by the computing device, a first request for a vehicle from a user;
generating, by the computing device, a digital user-token based on the request and transmitting the digital user-token to the user;
mapping, by the computing device, the digital user-token and the digital vehicle-key of the vehicle;
receiving, by the computing device, a second request from the user comprising the digital user-token and one or more user-commands for managing the vehicle;

retrieving, by the computing device, the digital vehicle-key of the vehicle based on the digital user-token in the second request;
constructing, by the computing device, one or more vehicle commands based on the one or more user-commands using the set of APIs of the vehicle-cloud associated with the vehicle; and
transmitting, by the computing device, the digital vehicle-key of the vehicle and the one or more vehicle commands to a vehicle-cloud corresponding to the vehicle for managing the vehicle according to the one or more vehicle commands;
after generating the digital user-token for a period of time that is greater than a threshold period, performing key rotation by:
generating a second digital user-token based on the first request from the user;
replacing the digital user-token with the second digital user-token; and
sending the second digital user-token to the user.

2. The method of claim 1, wherein the first request comprises a time period for using the vehicle, and the generating a digital user-token comprises:
configuring a valid time window for the digital user-token based on the time period in the first request;
embedding the valid time window into the digital user-token.

3. The method of claim 2, wherein after receiving the second request from the user, the method further comprises:
decoding the valid time window from the digital user-token;
verifying whether the digital user-token is expired; and
in response to the digital user-token being expired, sending an error message to the user.

4. The method of claim 1, wherein the generating the digital user-token comprises:
signing the digital user-token using a private key of the computing device, such that the digital user-token is verifiable by the user using a public key of the computing device.

5. The method of claim 1, wherein the one or more user-commands comprises commands for locking or unlocking of the vehicle, locating the vehicle, opening or closing one or more windows, opening or closing a compartment of the vehicle, controlling air conditioner or windows, or summoning the vehicle.

6. The method of claim 1, wherein the second request comprises a GPS location of a smart device from which the second request was received.

7. The method of claim 6, further comprising:
obtaining a GPS location of the vehicle;
determining whether a distance between a GPS location of the smart device and the GPS location of the vehicle is greater than a threshold;
in response to the distance being greater than a threshold, sending an error message to the user.

8. The method of claim 7, further comprising:
in response to the distance being lower than the threshold, transmitting the GPS location of the smart device to the vehicle-cloud.

9. The method of claim 1, further comprising:
displaying a graphic user interface (GUI) to the user exposing a plurality of unified APIs for managing vehicles through the plurality of sets of APIs.

10. The method of claim 9, wherein the second request is generated by the user triggering one or more of the plurality of unified APIs, wherein one of the one or more unified APIs comprises a parameter for specifying the digital user-token.

11. The method of claim 1, wherein the constructing one or more vehicle commands based on the one or more user-commands using the set of APIs of the vehicle-cloud associated with the vehicle comprises:
  generating one or more HTTP requests comprising one or more of GET, POST, PUT, DELETE with a payload based on the one or more user-commands.

12. The method of claim 1, wherein the second request further comprises a GPS location of a second smart device from which the second request was received and a second timestamp,
  the method further comprises:
  receiving a third request from the user comprising the digital user-token, one or more third user-commands for managing the vehicle, and a GPS location of a third smart device from which the third request was received and a third timestamp;
  determining a time gap between the second timestamp and the third timestamp and a distance between the GPS location of the second smart device and the GPS location of the third smart device; and
  disabling the user-token in response the time gap being lower than a time threshold and the distance being greater than a distance threshold.

13. The method of claim 1, wherein after receiving the first request for the vehicle from the user and before generating the digital user-token based on the request, the method further comprises:
  checking if the digital vehicle-key of the vehicle is already linked to another digital-token;
  in response to the digital vehicle-key of the vehicle being already linked to another digital-token, sending an error message to the user.

14. The method of claim 1, wherein the generating of the second digital user-token comprises:
  detecting whether there are pending user-commands for managing the vehicle using the digital user-token; and
  in response to pending user-commands being detected, delaying the key rotation by a preset delay period before retrying.

15. The method of claim 1, wherein the digital user-token is generated using a cryptographic hash function.

16. A system comprising one or more processors and one or more non-transitory computer-readable memories coupled to the one or more processors and configured with instructions executable by the one or more processors to cause the system to perform operations comprising:
  obtaining a plurality of digital vehicle-keys corresponding to a plurality of vehicles, wherein the plurality of vehicles are registered with a plurality of vehicle-clouds associated with the plurality of vehicles and allow remotely controlling the vehicles through the plurality of vehicle-clouds;
  obtaining a plurality of sets of APIs corresponding to the plurality of vehicle-clouds associated with the plurality of vehicles;
  receiving a first request for a vehicle from a user;
  generating a digital user-token based on the request and transmitting the digital user-token to the user;
  mapping the digital user-token and the digital vehicle-key of the vehicle;
  receiving a second request from the user comprising the digital user-token and one or more user-commands for managing the vehicle;

18 retrieving the digital vehicle-key of the vehicle based on the digital user-token in the second request;
  constructing one or more vehicle commands based on the one or more user-commands using the set of APIs of the vehicle-cloud associated with the vehicle; and
  transmitting the digital vehicle-key of the vehicle and the one or more vehicle commands to a vehicle-cloud corresponding to the vehicle for managing the vehicle according to the one or more vehicle commands;
  after generating the digital user-token for a period of time that is greater than a threshold period, performing key rotation by:
  generating a second digital user-token based on the first request from the user:
  replacing the digital user-token with the second digital user-token; and
  sending the second digital user-token to the user.

17. The system of claim 16, wherein the one or more user-commands comprises commands for locking or unlocking of the vehicle, locating the vehicle, opening or closing one or more windows, opening or closing a compartment of the vehicle, controlling air conditioner or windows, or summoning the vehicle.

18. The system of claim 16, wherein the second request comprises a GPS location of a smart device from which the second request was received, and the operations further comprise:
  obtaining a GPS location of the vehicle;
  determining whether a distance between a GPS location of the smart device and the GPS location of the vehicle is greater than a threshold;
  in response to the distance being greater than a threshold, sending an error message to the user.

19. A non-transitory computer-readable storage medium configured with instructions executable by one or more processors to cause the one or more processors to perform operations comprising:
  obtaining a plurality of digital vehicle-keys corresponding to a plurality of vehicles, wherein the plurality of vehicles are registered with a plurality of vehicle-clouds associated with the plurality of vehicles and allow remotely controlling the vehicles through the plurality of vehicle-clouds;
  obtaining a plurality of sets of APIs corresponding to the plurality of vehicle-clouds associated with the plurality of vehicles;
  receiving a first request for a vehicle from a user;
  generating a digital user-token based on the request and transmitting the digital user-token to the user;
  mapping the digital user-token and the digital vehicle-key of the vehicle;
  receiving a second request from the user comprising the digital user-token and one or more user-commands for managing the vehicle;
  retrieving the digital vehicle-key of the vehicle based on the digital user-token in the second request;
  constructing one or more vehicle commands based on the one or more user-commands using the set of APIs of the vehicle-cloud associated with the vehicle; and
  transmitting the digital vehicle-key of the vehicle and the one or more vehicle commands to a vehicle-cloud corresponding to the vehicle for managing the vehicle according to the one or more vehicle commands;
  wherein the second request further comprises a GPS location of a second smart device from which the second request was received and a second timestamp, and the operations further comprise:

receiving a third request from the user comprising the digital user-token, one or more third user-commands for managing the vehicle, a third timestamp, and a GPS location of a third smart device from which the third request was received;

determining a time gap between the second timestamp and the third timestamp and a distance between the GPS location of the second smart device and the GPS location of the third smart device; and disabling the user-token in response to the time gap being lower than a time threshold and the distance being greater than a distance threshold.

\* \* \* \* \*